United States Patent Office 2,728,748
Patented Dec. 27, 1955

2,728,748
POLYSULFIDE POLYMERS

Franklin O. Davis, Trenton, N. J., assignor, by mesne assignments, to Thiokol Chemical Corporation, Trenton, N. J., a corporation of Delaware No Drawing. Application October 27, 1952,
Serial No. 317,147

13 Claims. (Cl. 260—79.1)

This invention relates to the art of polysulfide polymers. One of the characteristics of such polymers is the recurrence of the disulfide —SS— linkage. As is well known, such polymers are commercially and commonly made by the reaction of alkaline or alkaline earth polysulfides with polyhalogenated organic compounds. The alkaline or alkaline earth metal of the polysulfide reagent combines with the halogen, for example, chlorine, and converts the latter into a salt, for example, sodium chloride, which constitutes a waste product. Thus the consumption of halogen, for example, chlorine, is great and the conversion thereof into a waste product is always an economic loss which adds materially to the cost of the product. Moreover, in times of emergency chlorine is in very short supply and difficulties in meeting production quotas of polysulfide polymers made by the conventional method are therefore met.

One of the objects of the present invention is to produce polysulfide polymers made by a process which greatly reduces the consumption of chlorine. The polymers are made in an intermediate form with a very low chlorine consumption and having a relatively low molecular weight. Those intermediate polymers can then be converted into high molecular weight polymers by further condensation with no additional chlorine consumption. As shown in Case A below, a polymer having a molecular weight of about 1800 is obtained with a chlorine consumption of only 2 chlorine atoms, as compared with a chlorine consumption of 22 chlorine atoms to obtain the same product by the conventional reaction of 11 mols of dichlor diethyl formal and 10 mols of Na$_2$S$_2$.

Another object is to improve the yields of polysulfide polymers.

The polymers of this invention respond to the general formula $$(FR''S)_{2+(n-2)y}(SRS)_x(R'S_n)_y$$

where F is a member of the group consisting of hydroxyl and halogen, $n$ varies from 2 to 6, $x$ varies from 2 to 200 and $y$ varies from 0 to 100, R and R' being oxahydrocarbon aliphatic radicals, R having a sulfur connected valence of only 2 and R' having a sulfur connected valence of $n$, and R'' being a radical of the group consisting of alkylene radicals and bivalent aliphatic oxahydrocarbon radicals.

In accordance with the present invention a dithio digylcol having the general formula HOR'''SSR'''OH, for example dithio diethylene glycol, is reacted with formaldehyde and a dihalogenated formal having the general formula ClR'''OCH$_2$OR'''Cl, as for example BB' dichlor diethyl formal, where R''' is an alkylene radical having one to six carbon atoms.

By controlling the ratio of formaldehyde to glycol polymers can be obtained having either chlorine terminals or hydroxyl terminals, and by controlling the mol ratio of dichlor formal to the glycol the degree of polymerization can be controlled. The reaction can be symbolized as follows: Case A symbolizes the production of chlorine terminated polymers, and Case B, hydroxyl terminated polymers.

In the equations set forth in Case A and Case B, the present reaction is described as occurring in several steps in order to explain more clearly the probable mechanism of the reaction. However, as indicated in the specific examples given hereafter, the reaction may be conveniently carried out in a single statge wherein all of the several steps occur substantially simultaneously.

Case A (Chlorine terminated polymers)

In each case, purely for purposes of illustration diethio diethylene glycol will be taken to illustrate the glycol and BB' dichlor diethyl formal will be taken to illustrate the halogenated formal employed.

1. $10HOC_2H_4SSC_2H_4OH + 9CH_2O =$
   $HO(C_2H_4SSC_2H_4OCH_2O)_9C_2H_4SSC_2H_4OH + 9H_2O$

2. Step 1 Polymer $+ ClC_2H_4OCH_2OC_2H_4Cl =$
   $HO(C_2H_4SSC_2H_4OCH_2O)_9C_2H_4SSC_2H_4$
   $OCH_2OC_2H_4Cl + ClC_2H_4OH$ 3. Step 2 Products $+ CH_2O =$
   $ClC_2H_4OCH_2O(C_2H_4SSC_2H_4OCH_2O)_9$
   $(C_2H_4SSC_2H_4OCH_2O)C_2H_4Cl + H_2O$

Case B (Hydroxyl terminated polymers)

1. $9HOC_2H_4SSC_2H_4OH + 8CH_2O =$
   $HOC_2H_4S(SC_2H_4OCH_2OC_2H_4S)_8SC_2H_4OH$

2. Step 1 Product $+ ClC_2H_4OCH_2OC_2H_4Cl =$
   $HOC_2H_4S(SC_2H_4OCH_2OC_2H_4S)_8$
   $SC_2H_4OCH_2OC_2H_4Cl + ClC_2H_4OH$ 3. Step 2 Product $+ HOC_2H_4SSC_2H_4OH =$
   $HOC_2H_4S(SC_2H_4OCH_2OC_2H_4S)_8$
   $SC_2H_4OCH_2OC_2H_4SSC_2H_4OH + ClC_2H_4OH$ This product may be written as

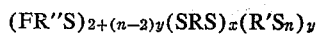
$HOC_2H_4S(SC_2H_4OCH_2OC_2H_4S)_9SC_2H_4OH$

The formula of the product produced in Case A is
(1) $ClR'''OCH_2O(R'''SSR'''OCH_2O)_aR'''Cl$ identical with (2) 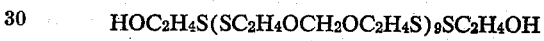

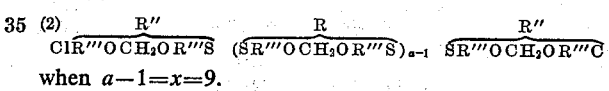

when $a-1=x=9$.

Since $a-1=x$, it is evident that $a=x+1$. The ratios involved may be shown to be $$\frac{1}{x+1}$$

for the controlling ratio of the formal to glycol where the repeating units are written as in Formula 1, in the following manner: in the radical (R'''SSR'''OCH$_2$O)$_a$ in the Formula 1, R'''SSR''' is derived from $a$ mols of

HOR'''SSR'''OH and $a$ mols of CH$_2$O by elimination of $a$ mols of H$_2$O. The ratio of HOR'''SSR'''OH to formaldehyde is therefore $a/a$ or 1:1. It may also be said that the polymer as written in Formula 1 having the terminals

$ClC_2H_4OCH_2O \ldots C_2H_4Cl$ may be considered as 1 mol of $ClC_2H_4OCH_2OC_2H_4Cl$ and $a$ mols of glycol and formaldehyde. The ratio of the formal to the glycol is thus $$\frac{1}{a}$$

But $a$ has been shown to equal $x+1$. Therefore the ratio of formal to glycol is $$\frac{1}{x+1}$$

A ratio of glycol to formaldehyde of 1:1 or less is required to have chlorine terminals, and a molar ratio of formal to glycol of $$\frac{1}{x+1}$$

is required to have $x$ repeating units, in the general formula as written below.

If the repeating units are expressed as in Formula 1 above, then the ratio of formal to glycol which controls the size of the polymer is $$\frac{1}{a}$$

but if the preferred Formula 2 is employed, then the said ratio is written as $$\frac{1}{x+1}$$

However, the value of the said ratio is not determined by the form in which the repeating unit is expressed since $$\frac{1}{a} = \frac{1}{x+1}$$

Form (2) is preferred as shown in the general formula.

The formula of the product in Case B is

HOR'''S(SR'''OCH$_2$OR'''S)$_x$SR'''OH where $x=9$.

The general formula to which the products of Cases A and B conform is

FR''S(SRS)$_x$SR''F where F is chlorine or hydroxyl and R is the dialkylene formal radical —R'''OCH$_2$OR'''— and R'' is that radical or the alkylene radical R'''. $x$ is a value which may vary from 2 to 200 depending on the mol ratio of the formal ClR'''OCH$_2$OR'''Cl to the glycol HOR'''SSR'''OH.

It will be seen that in Case A the total mol ratio of glycol to formaldehyde is 1. See steps 1 and 3. The same result would occur if the ratio is less than 1. In Case A the mol ratio of glycol to formaldehyde must not be greater than 1, preferably 0.5 to 1. Values of less than 0.5 contribute an excess of formaldehyde which is not consumed in the reaction. Values greater than 1.0 produce hydroxyl terminated polymers. Step 1 shows the condensation of the formaldehyde with glycol to make a polythio polyglycol having the repeating unit (C$_2$H$_4$SSC$_2$H$_4$OCH$_2$O), which may be written as SC$_2$H$_4$OCH$_2$OC$_2$H$_4$S. Reaction according to steps 2 and 3 provides that polymer with chlorine terminals by reaction with dichlor diethyl formal with the production of ethylene chlorohydrin (see step 2) which, however, is immediately condensed by the formaldehyde to produce the chlorine terminated polymer shown in Step 3 in which the repeating unit is

C$_2$H$_4$SSC$_2$H$_4$OCH$_2$O

The degree of polymerization of that polymer is measured by the number of those repeating units and that is controlled by controlling the mol ratio of the dichlor diethyl formal to the glycol. In Case A this ratio is 1 to 10 and the resulting polymer therefore has an average of 10 of those repeating units. The number of those units can be increased by decreasing that ratio. For example, should the ratio be 1 to 20 then there would be an average of 20 repeating units in the resulting polymer.

The nature of the terminals, that is, whether hydroxyl or chlorine, is determined by the mol ratio of glycol to formaldehyde. If that ratio is not greater than 1, the resulting polymer is chlorine terminated as in Case A. If that ratio is greater than 1, the resulting polymer will be hydroxyl terminated as in Case B. Case B may be symbolized by the same equations indicated in Case A except that the polymer indicated in step 3 of Case A is reacted with another mol of glycol, which establishes a ratio of glycol to formaldehyde of 11 to 10 (greater than 1) and provides the resulting polymer with hydroxyl terminals from the glycol and results in the production of byproduct ethylene chlorhydrin. For the production of hydroxyl terminals the mol ratio of said glycol HOR'''SSR'''OH to formaldehyde may be any value greater than 1, preferably not greater than 2 because values greater than 2 give an excess of glycol which is not consumed in the reaction.

The polymer obtained according to Cases A and B, whether hydroxyl or chlorine terminated, will be liquid, a waxy solid or a rubbery solid depending upon the value of $x$, that is, the degree of polymerization. The liquids and waxes may be used as lubricating oil additives, potting compounds when suitably cured, coating materials and plasticizers. The rubbery polymers may be used as coating and impregnating materials. The hydroxyl terminated liquids or waxes may also be further cured particularly by means of polyepoxide curing agents and converted into solid rubbery materials having a higher degree of condensation and also useful as coating and impregnating materials.

The liquid or waxy chlorine terminated polymers may be converted into solid rubbery polysulfide materials having a higher degree of condensation or polymerization, by reaction with alkaline polysulfides, having the same repeating units, properties and uses as the well known formal polysulfide products including coatings and impregnants.

It will be seen that the proportion of chlorine compounds used in the present invention is small and decreases with increase in molecular size of the polymer obtained since the smaller the mol ratio of the chlorinated formal to glycol, the greater is the size of the molecule obtained, that ratio being $$\frac{1}{x+1}$$

where $x$ is the desired number of repeating units in the polymer resulting from the reaction of the said glycol HOR'''SSR'''OH, formaldehyde and formal.

In addition to those compounds, compounds producing cross linkage in the polymer may be used in the present invention, including specifically Glycerine
Sorbitol
Pentaerythritol
1,2,7,8 tetra hydroxy 4,5 dithiaoctane (having the formula

HOCH$_2$.CHOH.CH$_2$SSCH$_2$CHOHCH$_2$OH)

and monomeric water soluble polyhydric alcohols in general, having from 3 to 6 hydroxyl groups The proportion of the above cross linkage producing compounds should be used within the range of about 0.5 to 5% mol percent of the glycol having the general formula HOR'''SSR'''OH.

Moreover, in addition to glycols having that formula, those having the general formula HOR'''SR'''OH as well as other monomeric glycols in general having from one to six carbon atoms such as those shown in the following list may be used:

HO.CH$_2$CH$_2$.OH ethylene glycol

HO.CH$_2$CH$_2$CH$_2$OH trimethylene glycol

HO.CH$_2$CH$_2$CH$_2$CH$_2$.OH tetramethylene glycol

HO.CH$_2$.CH$_2$.CH$_2$CH$_2$CH$_2$.OH pentamethylene glycol

HO.CH$_2$CH$_2$CH$_2$CH$_2$CH$_2$CH$_2$.OH hexamethylene glycol

HO.CH$_2$CH$_2$.O.CH$_2$CH$_2$.OH diethylene glycol

HO.CH$_2$CH$_2$.O.CH$_2$CH$_2$.O.CH$_2$CH$_2$.OH triethylene glycol

CH$_3$.CHOH.CH$_2$OH propylene glycol

In using glycols in addition to those having the general formula HOR"SSR'"OH, the total glycol content should have at least about 50% by weight of glycol having the formula HOR'"SSR'"OH, and the mol ratio of glycol to formaldehyde means the mol ratio of the total glycol content to formaldehyde.

In Cases A and B the products respond to the formula $$FR''S(SRS)_xSR''F$$

where F is a chlorine or hydroxyl and R is the dialkylene formal radical —R'"OCH$_2$OR'"— and R" is that radical or the alkylene radical R'", and $x$ is a number varying from 2 to 200 as previously mentioned.

The radical R is the bivalent radical R'"OCH$_2$OR'" and is a part of the product derived by condensation of the formaldehyde and the glycol HOR'"SSR'"OH as follows:

HOR'"SSR'"OH + CH$_2$O + HOR'"SSR'"OH ⟶

HOR'"SSR'"OCH$_2$OR'"SSR'"OH thus the alkylene R'" radical of the glycol

HOR'"SSR'"OH is absorbed into and becomes a part of the radical R of the repeating unit SRS.

As previously described, polyhydric alcohols having from 3 to 6 hydroxyl groups and glycols containing no —SS— groups and having from 1 to 6 carbon atoms, or both, may be included in the reaction illustrated by Cases A and B. When that is done the general formula of the product becomes modified as follows:

$$(FR''S)_{2+(n-2)y}(SRS)_x(R'S_n)_y$$

where R' is an aliphatic oxahydrocarbon radical, $n$ varies from 2 to 6, $y$ varies from 1 to 1000, and $x$ varies from 2 to 200.

The use of a polyhydric alcohol or a mixture of said polyhydric alcohol and a glycol containing no —SS— linkage, in addition to the reactants shown in Cases A and B, increases the number of (FR"S) groups beyond the two terminal groups (FR"S) shown in Cases A and B to the extent of $(n-2)y$.

The average number of cross linking or branching bonds created by the number of —OH groups provided by the polyhydric alcohol or mixture thereof with a glycol containing no —SS— linkage is $(n-2)y$ because it is the —OH groups which generate the bonds or valences for chain formation and also for union with (SR"F) groups in the ultimate polymer. The total number of said bonds is $n \times y$ where $n$ is the number of OH groups in the polyhydric alcohol or average number of hydroxyl groups in the mixture of polyhydric alcohol and said glycol and also the total number of bonds derived from said —OH groups as above shown and $y$ is the number of the (R'S$_n$) groups in the polymer as above indicated. But since two of said bonds are used in chain formation, then $(n-2)y$ is the total number of bonds available for cross linkage and also the number of (FR"S) units in addition to the two (FR"S) terminal groups which would be present in the absence of said polyhydric alcohol or mixture thereof with glycol containing no —SS— linkage.

The derivation of the unit R'S$_n$ is symbolically indicated by the following structure where glycerine is used as the polyhydric alcohol:

CH$_2$OH + CH$_2$O + HOR'"SSR'"OH
|
CHOH + CH$_2$O + HOR'"SSR'"OH ⟶
|
CH$_2$OH + CH$_2$O + HOR'"SSR'"OH

| R'S$_n$ | (SR"F)$_n$ |
|---|---|
| CH$_2$OCH$_2$OR'"S— | —SR'"OH |
| CHOCH$_2$OR'"S— | —SR'"OH |
| CH$_2$OCH$_2$OR'"S— | —SR'"OH |

+ 3H$_2$O

The R'S$_n$ and FR"S units are indicated by the dotted lines. The new cross linking unit (R'S$_n$) is derived from the glycerine and the glycol HOR'"SSR'"OH by condensation with formaldehyde, and some of the alkylene groups R'" become absorbed into and form a part of the radical R'. In the above particular case, $n$ is 3 because three mols of the glycol HOR'"SSR'"OH react with the three hydroxyl groups of glycerine.

There are also three corresponding terminal FR"S groups, those R" radicals being identical with the alkylene R'" radicals.

From what has been said, it will be clear that the radicals R and R' are aliphatic oxahydrocarbon radicals and the radical R" may be an aliphatic bivalent radical, i. e. an alkylene radical as shown above or a bivalent aliphatic oxahydrocarbon radical as in Case A.

Where a conventional glycol (but no polyhydric alcohol) is added to the reactants illustrated in Cases A and B, the product conforms to the above modified general formula where $n$ equals 2. The radical R' then contains the structure of the R'" radical of the glycol

HOR'"SSR'"OH and also structure from said conventional glycol and formaldehyde as illustrated symbolically as follows:

HOR'"SSR'"OH+CH$_2$O+HOGOH+CH$_2$O+HOR'"SSR'"OH=
HOR'"SSR'"OCH$_2$OGOCH$_2$OR'"SSR'"OH+2H$_2$O

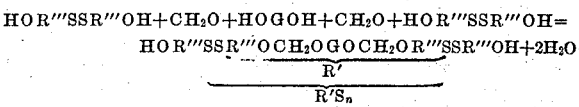

where $n$ equals 2.

HO G OH represents said conventional glycol which is monomeric and has from 1 to 6 carbon atoms.

Where both said conventional glycol, i. e. one having no —SS— linkage, and also a polyhydric alcohol are reacted with an HOR'"SSR'"OH glycol, formaldehyde and a formal having the formula Cl R'" OCH$_2$OR'"Cl, according to the invention, the product conforms to said general formula $$(FR''S)_{2+(n-2)y}(SRS)_x(R'S_n)_y$$

For instance, if a mixture of 20 mols of HOC$_2$H$_4$OH and 1 mol of glycerine are so employed, the 21 mols would provide 43 OH groups and the radical R'S$_n$ would then become (R'S$_{2·047}$)$_{21}$.

The subscripts are average or statistical values. Any value of $n$ above 2 means that cross linking structure is present.

The radical R' as above mentioned is an aliphatic oxahydrocarbon radical having an average sulfur-connected valence equal to $n=2.047$. The said radical R' is composed of the structure of the R'" radical of the HOR'"SSR"OH glycol plus structure from the polyhydric alcohol and said conventional glycol as above explained and illustrated.

The formula $(FR''S)_{2+(n-2)y}(SRS)_x(R'S_n)_y$ is a general one applicable to all products of the invention where $n$ varies from 2 to 6 and equals the number of hydroxyl groups in the said conventional glycol or polyhydric alcohol or the average number of hydroxyl groups in mixtures thereof, $x$ varies from 2 to 200, and $y$ varies from 0 to 100, R and R' are oxahydro-carbon aliphatic radicals, R having a sulfur connected valence of 2 and R' a sulfur connected valence of $n$, and R" is an alkylene radical or a bivalent aliphatic oxahydrocarbon radical.

Where the polymer contains no (R'S$_n$) units, as in Cases A and B, the mol ratio of the formula ClR'"SSR'"Cl to the glycol HOR'"SSR'"OH controls the molecular weight and that ratio is $$\frac{1}{x+1}$$

where $x$ is the number of (SRS) units desired. Where, however, a polyhydric alcohol with or without a conventional glycol, i. e. a glycol having no —SS— linkage, is included in the reaction, and the unit (R'S$_n$) thus obtained, the mol ratio of the formal to the total hydroxyl reactants containing —SS— linkage is the controlling ratio as to molecular weight of the product and

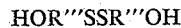

where $x$ and $y$ are the numbers of (SRS) and (R'S$_n$) units in the polymer product, respectively.

The reaction is conveniently carried out by refluxing the reactants in the presence of a water immiscible solvent boiling at about 80–140° C. in reflux apparatus provided with a trap which separates the water solvent mixture, returns the solvent automatically to the reaction mixture and enables the water to be separated. The reaction is continued until water ceases to be evolved. In the production of the hydroxyl terminated polymers (Case B) ethylene chlorhydrin or other alkylene chlorhydrin, e. g. ClR'''OH, will be evolved with and pass into the water condensate and may be recovered therefrom. Typical solvents which may be employed for the purpose indicated include benzene, toluene, xylene, ethylene dichloride and propylene dichloride.

Illustrative examples are shown below. In each instance the reactants are refluxed in the presence of the solvent, as above stated, water is collected and separated by means of the trap, and the refluxing is continued until water ceases to be evolved. The solvent is then distilled off and the desired polymer remains as a residue. The chlorinated formal splits off a small proportion of hydrochloric acid which supplies a catalyst and it is not necessary to add an additional catalyst. However, from 0.1 to 1 percent by weight, based on the glycol

of a catalyst may be added. Typical illustrative catalysts are hydrochloric acid, sulfuric acid, phosphoric acid, toluene sulfonic acid and ferric chloride.

*Example 1*

A reactor equipped with a reflux column is charged with 154 grams (1 mol) of dithiodiglycol, 30 grams (1 mol) of formaldehyde, 17.3 grams (0.1 mol) of dichlorodiethyl formal and 100 cc. of benzene. The reaction mixture is heated to the boiling point under reflux, and a mixture of water vapor and benzene vapor is distilled off and condensed. The resulting liquid benzene is separated from the water by decantation and returned to the reactor. Heating is continued until no more water is evolved and the benzene is then distilled off.

The residue in the reactor is a chlorine-terminated linear polymer having the average formula $ClC_2H_4OCH_2O(C_2H_4SSC_2H_4OCH_2O)_{10}C_2H_4Cl$ It has an average molecular weight of about 1800 and is a slightly viscous liquid.

*Example 2*

The procedure of Example 1 is followed except that 31 grams (0.5 mol) of ethylene glycol is added to the reaction mixture and 60 grams (2.0 mol) of formaldehyde is used instead of 1.0 mol as in Example 1.

The resulting polymer is a chlorine-terminated linear polymer containing both $(SC_2H_4OCH_2OC_2H_4S)$ units and $(SC_2H_4OCH_2OC_2H_4OCH_2OC_2H_4S)$ units. It has an average molecular weight of about 2000 and is a slightly viscous liquid.

*Example 3*

A reactor equipped with a reflux column is charged with 154 grams (1.0 mol) of dithiodiglycol, 106 grams (1.0 mol) of diethylene glycol, 63 grams (2.1 mol) of formaldehyde, 34.6 grams (0.2 mol) of dichlor-diethyl formal and 200 cc. of benzene. The reaction mixture is refluxed and water removed as in Example 1. After removal of the solvent benzene, the residue in the reactor is a chlorine-terminated linear polymer having the recurring units $(SC_2H_4OCH_2OC_2H_4OCH_2OC_2H_4S)$. It has a molecular weight of about 1400 and is a slightly viscous liquid.

*Example 4*

A reactor equipped with a reflux column is charged with 154 grams (1 mol) of dithiodiglycol, 1.84 grams (.02 mol) of glycerine, 33 grams (1.1 mol) of formaldehyde, 17.3 grams (0.1 mol) of dichloro-diethyl formal and 100 cc. of toluene. The reaction mixture is refluxed and water removed as in Example 1. After removal of the solvent toluene, the residue in the reactor is a chlorine-terminated, cross-linked polymer having an average molecular weight of about 1800 to 1900. It is a viscous liquid.

*Example 5*

The procedure of Example 3 is followed except that 1.84 grams (0.02 mol) of glycerine is added to the reaction mixture. The resulting product polymer is cross-linked and is a viscous liquid.

*Example 6*

The procedure of Example 1 is followed except that the quantity of dithiodiglycol is increased to 169.4 grams (1.1 mol) and the quantity of formaldehyde is reduced to 27 grams (0.9 mol). With these proportions chlorhydrin is evolved and distills off with the water during refluxing.

The product is a hydroxyl-terminated, linear polymer having a molecular weight of about 1800. It is a viscous liquid.

*Example 7*

A reactor equipped with a reflux column is charged with 169.4 grams (1.1 mol) of dithiodiglycol, 106 grams (1 mol) of diethylene glycol, 60 grams (2 mols) of formaldehyde, 8.65 grams (0.05 mol) of dichloro-diethyl formal, and 200 cc. of trichloroethane. The reaction mixture is refluxed and water, chlorhydrin and trichloroethane are removed and condensed. The trichloroethane is returned to the reactor until no more water and chlorhydrin distill over, after which it is removed by distillation. The residue is a hydroxyl-terminated, linear polymer having a molecular weight of about 6000. It is a very viscous liquid.

*Example 8*

The procedure of Example 7 is followed except that 62 grams (1 mol) of ethylene glycol is substituted for the diethylene glycol of Example 7 and toluene is used as a solvent.

The residue in the reactor after distillation of the toluene therefrom is a hydroxyl-terminated polymer having a molecular weight of about 5000 and is a very viscous liquid.

*Example 9*

A reactor equipped with a reflux column is charged with 169.4 grams (1.1 mols) of dithiodiglycol, 2.72 grams (0.02 mols) of pentaerythritol, 62 grams (1 mol) of ethylene glycol, 61.5 grams (2.05 mols) of formaldehyde, 8.65 grams (0.05 mols) of dichlorodiethyl formal and 200 cc. of benzene. The reaction mixture is refluxed and water and chlorhydrin removed as in Example 7. The benzene is then removed by distillation and the residue is a hydroxyl-terminated, cross-linked polymer having a molecular weight of about 4000. The product is a soft waxy solid.

*Example 10*

The procedure of Example 9 is followed except that 1.84 grams (0.02 mols) of glycerine is used in place of the pentaerythritol. The resulting product is a hydroxyl-terminated, cross-linked polymer which is a soft waxy solid.

*Example 11*

The procedure of Example 6 is followed except that 1.84 grams (0.02 mol) of glycerine is added to the reaction mixture. The resulting product is a hydroxyl-terminated, cross-linked polymer which is a soft waxy solid.

It is of course to be understood that the foregoing examples are illustrative and that changes in the reactants and proportions can be made without departing from the spirit of the invention as defined in the appended claims.

What is claimed is:

1. Process of making a polysulfide polymer having the general formula $(FR''S)_2(SRS)_x$, where F is a member of the group consisting of hydroxyl and halogen, R is the bivalent radical $-R'''OCH_2OR'''-$ having only two sulfur connected valences and R'' is a bivalent radical of the group consisting of the radical $-R'''OCH_2OR'''-$ and the alkylene radical $-R'''-$, S being sulfur, $x$ varying from 2 to 200, which comprises reacting a glycol of the formula $HOR'''SSR'''OH$, formaldehyde and a dichlor dialkylene formal having the formula $$ClR'''OCH_2OR'''Cl$$

R''' being an alkylene radical having from one to six carbon atoms, where the mol ratio of said glycol to formaldehyde is greater than 1 and not greater than 2 for the production of the hydroxyl terminated polymers, and from 0.5 to 1 for the production of chlorine terminated polymers, and the mol ratio of said formal to said glycol being $$\frac{1}{x+1}$$

where $x$ equals the number of said repeating (SRS) units in the resulting polymer, and effecting the reaction by heating the reactants to a temperature of 80° to 140° C.

2. Process of making a polysulfide polymer having the general formula $(HOR''S)_2(SRS)_x$, where R is the radical $-R'''OCH_2OR'''-$ having only two sulfur connected valences and R'' is the bivalent alkylene radical R''', S being sulfur, and $x$ varying from 2 to 200, which comprises reacting a glycol of the formula $HOR'''SSR'''OH$, formaldehyde and a dichlor dialkylene formal having the formula $ClR'''OCH_2OR'''Cl$, R''' being an alkylene radical having from one to six carbon atoms, the mol ratio of said glycol to formaldehyde being greater than 1 and not greater than 2, and the mol ratio of said formal to said glycol being $$\frac{1}{x+1}$$

where $x$ equals the desired number of said repeating (SRS) units in the resulting polymer, and effecting the reaction by heating the reactants to a temperature of 80° to 140° C.

3. Process of making a polysulfide polymer having the general formula $(ClR''S)_2(SRS)_x$, R and R'' each being the bivalent radical $-R'''OCH_2OR'''-$, S being sulfur, $x$ varying from 2 to 200, which comprises reacting a glycol of the formula $HOR'''SSR'''OH$, formaldehyde and a dichlor dialkylene formal having the formula $ClR'''OCH_2OR'''Cl$, R''' being an alkylene radical having from one to six carbon atoms, where the mol ratio of glycol to formaldehyde is from 0.5 to 1 and the mol ratio of said formal to said glycol being $$\frac{1}{x+1}$$

where $x$ equals the desired number of said repeating units (SRS) in the resulting polymer, and effecting the reaction by heating the reactants to a temperature of 80° to 140° C.

4. Process of making a polysulfide polymer having the general formula $(FR''S)_{2+(n-2)y}(SRS)_x(R'S_n)_y$, where F is chlorine, R and R'' each being the bivalent radical $-R'''OCH_2OR'''-$, R having only two sulfur connected valences and R' being an aliphatic oxahydrocarbon radical having a sulfur connected valence equal to $n$, S being sulfur, $x$ varying from 2 to 200, $y$ varying from 1 to 10, $n$ varying from 2 to 6, which comprises reacting a glycol of the formula $HOR'''SSR'''OH$, a water soluble polyhydric alcohol having from 3 to 6 hydroxyl groups, formaldehyde, and a dichlor dialkylene formal having the formula $ClR'''OCH_2OR'''Cl$, R''' being an alkylene radical having from 1 to 6 carbon atoms, the mol ratio of the glycol $HOR'''SSR'''OH$ and polyhydric alcohol to formaldehyde being from 0.5 to 1.0, the proportion of the said polyhydric alcohol to the glycol $HOR'''SSR'''OH$ being from 0.5 to 5 mol per cent, and the mol ratio of said formal to the glycol $HOR'''SSR'''OH$ being $$\frac{1}{x+y+1}$$

where $x$ and $y$ are the desired number of said repeating units (SRS) and (R'S$_n$) in the resulting polymer, and effecting the reaction by heating the reactants to a temperature of 80° to 140° C.

5. Process of making a polysulfide polymer having the general formula $(FR''S)_{2+(n-2)y}(SRS)_x(R'S_n)_y$, where F is chlorine, R'' being the bivalent radical $$-R'''OCH_2OR'''-$$

R and R' each being an aliphatic oxahydrocarbon radical, R having only two sulfur connected valences and R' having a sulfur connected valence equal to $n$, S being sulfur, $x$ varying from 2 to 200, $y$ varying from 1 to 10, $n$ varying from 2 to 6, which comprises reacting a glycol of the formula $HOR'''SSR'''OH$, a monomeric glycol containing no $-SS-$ groups and having from one to six carbon atoms, the glycol $HOR'''SSR'''OH$ being at least 50 percent by weight of the total glycol content, a polyhydric alcohol having from 3 to 6 hydroxyl groups, formaldehyde, and a dichlor dialkylene formal having the formula $ClR'''OCH_2OR'''Cl$, R''' being an alkylene radical having from one to six carbon atoms, the mol ratio of the total glycol and polyhydric alcohol content to formaldehyde being from 0.5 to 1.0, the proportion of the said polyhydric alcohol to the glycol $HOR'''SSR'''OH$ being from 0.5 to 5 mol per cent, and the mol ratio of said formal to the glycol $HOR'''SSR'''OH$ being $$\frac{1}{x+y+1}$$

where $x$ and $y$ are the desired number of said repeating units (SRS) and (R'S$_n$) in the resulting polymer, and effecting the reaction by heating the reactants to a temperature of 80° to 140° C.

6. Process of making a polysulfide polymer having the general formula $(FR''S)_{2+(n-2)y}(SRS)_x(R'S_n)_y$, where F is hydroxyl, R'' is the alkylene radical R''', R is the formal radical $-R'''OCH_2OR'''-$, R having only two sulfur connected valences and R' being an aliphatic oxahydrocarbon radical having a sulfur connected valence equal to $n$, S being sulfur, $x$ varying from 2 to 200, $y$ varying from 1 to 10, $n$ varying from 2 to 6, which comprises reacting a glycol of the formula $$HOR'''SSR'''OH$$

a water soluble polyhydric alcohol having from 3 to 6 hydroxyl groups, formaldehyde, and a dichlor dialkylene formal having the formula $ClR'''OCH_2OR'''Cl$, R''' being an alkylene radical having from 1 to 6 carbon atoms, the mol ratio of the glycol $HOR'''SSR'''OH$ and polyhydric alcohol to formaldehyde being greater than 1 and not greater than 2, the proportion of the said polyhydric alcohol to the glycol $HOR'''SSR'''OH$ being from 0.5 to 5 mol per cent, and the mol ratio of said formal to the glycol HOR'''SSR'''OH being $$\frac{1}{x+y+1}$$

where $x$ and $y$ are the desired number of said repeating units (SRS) and (R'S$_n$) in the resulting polymer, and effecting the reaction by heating the reactants to a temperature of 80° to 140° C.

7. Process of making a polysulfide polymer having the general formula (FR''S)$_{2+(n-2)y}$(SRS)$_x$(R'S$_n$)$_y$, where F is hydroxyl, R'' is the alkylene radical R''', R and R' each being an aliphatic oxahydrocarbon radical, R having only two sulfur connected valences and R' having a sulfur connected valence equal to $n$, S being sulfur, $x$ varying from 2 to 200, $y$ varying from 1 to 10, $n$ varying from 2 to 6, which comprises reacting a glycol of the formula HOR'''SSR'''OH, a monomeric glycol containing no —SS— groups and having from one to six carbon atoms, the glycol HOR'''SSR'''OH being at least 50 percent by weight of the total glycol content, a polyhydric alcohol having from 3 to 6 hydroxyl groups, formaldehyde, and a dichlor dialkylene formal having the formula Cl R'''OCH$_2$OR'''Cl, R''' being an alkylene radical having from 1 to 6 carbon atoms, the mol ratio of the total glycol and polyhydric alcohol content to formaldehyde being greater than 1 and not greater than 2, the proportion of the said polyhydric alcohol to the glycol HOR'''SSR'''OH being from 0.5 to 5 mol per cent, and the mol ratio of said formal to the glycol HOR'''SSR'''OH being $$\frac{1}{x+y+1}$$

where $x$ and $y$ are the desired number of said repeating units (SRS) and (R'S$_n$) in the resulting polymer, and effecting the reaction by heating the reactants to a temperature of 80° to 140° C.

8. Process of making a polysulfide polymer having repeating units (SC$_2$H$_4$OCH$_2$OC$_2$H$_4$S) and chlorine terminals, which comprises reacting dithio diethylene glycol, formaldehyde and BB' dichlor diethylene formal Cl C$_2$H$_4$OCH$_2$OC$_2$H$_4$ Cl, the mol ratio of said glycol to formaldehyde being from 0.5 to 1.0 and the mol ratio of said formal to said glycol being $$\frac{1}{x+1}$$

where $x$ equals the desired number of said repeating units in the resulting polymer, and effecting the reaction by heating the reactants to a temperature of 80° to 140° C., $x$ varying from 2 to 200.

9. Process of making a polysulfide polymer having repeating units (SC$_2$H$_4$OCH$_2$OC$_2$H$_4$S) and hydroxyl terminals, which comprises reacting dithio diethylene glycol, formaldehyde, and BB' dichloro diethylene formal Cl C$_2$H$_4$OCH$_2$OC$_2$H$_4$ Cl, the mol ratio of said glycol to formaldehyde being greater than 1 and not greater than 2, and the mol ratio of said formal to said glycol being $$\frac{1}{x+1}$$

where $x$ equals the desired number of said repeating units in the resulting polymer, and effecting the reaction by heating the reactants to a temperature of 80° to 140° C., $x$ varying from 2 to 200.

10. Process of maikng a polysulfide polymer having $x$ repeating units (SC$_2$H$_4$OCH$_2$OC$_2$H$_4$S) and $y$ repeating units

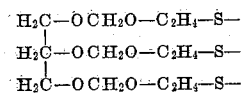

and chlorine terminals, which comprises reacting dithio diethylene glycol HOC$_2$H$_4$SSC$_2$H$_4$OH, glycerine, formaldehyde, and BB' dichlor diethylene formal, the mol ratio of said glycol and gylcerine to formaldehyde being from 0.5 to 1.0, the proportion of glycerine to said glycol being from 0.5 to 5 mol percent, and the mol ratio of said formal to said glycol being $$\frac{1}{x+y+1}$$

where $x$ and $y$ are the desired number of said repeating units, respectively, in the resulting polymer, and effecting the reaction by heating the reactants to a temperature of 80° to 140° C., $x$ varying from 2 to 200 and $y$ varying from 0 to 100.

11. Process of making a polysulfide polymer having $x$ repeating units (SC$_2$H$_4$OCH$_2$OC$_2$H$_4$S) and $y$ repeating units

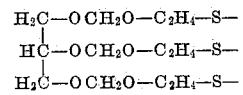

and hydroxyl terminals, which comprises reacting dithio diethylene glycol HOC$_2$H$_4$SSC$_2$H$_4$OH, glycerine, formaldehyde, and BB' dichlor diethylene formal, the mol ratio of said glycol and glycerine to formaldehyde being greater than 1 and not greater than 2, the proportion of glycerine to said glycol being from 0.5 to 5 mol percent, and the mol ratio of said formal to said glycol being $$\frac{1}{x+y+1}$$

where $x$ and $y$ are the desired number of said repeating units, respectively, in the resulting polymer, and effecting the reaction by heating the reactants to a temperature of 80° to 140° C., $x$ varying from 2 to 200 and $y$ varying from 0 to 100.

12. Process of making a polysulfide polymer having $x$ repeating units

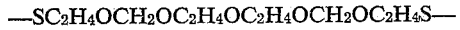
—SC$_2$H$_4$OCH$_2$OC$_2$H$_4$OC$_2$H$_4$OCH$_2$OC$_2$H$_4$S— and $y$ repeating units

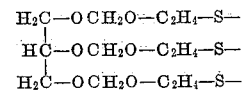

and chlorine terminals, which comprises reacting dithio diethylene glycol HOC$_2$H$_4$SSC$_2$H$_4$OH, diethylene glycol, the dithio diethylene glycol being at least 50 percent by weight of the total glycol content, glycerine, formaldehyde, and BB' dichlor diethylene formal, the mol ratio of the total glycol content to formaldehyde being from 0.5 to 1, the proportion of glycerine to said dithio diethylene glycol being from 0.5 to 5 mol percent, and the mol ratio of said formal to said dithio diethylene glycol being $$\frac{1}{x+y+1}$$

where $x$ and $y$ are the desired number of said repeating units, respectively, in the resulting polymer, and effecting the reaction by heating the reactants to a temperature of 80° to 140° C., $x$ varying from 2 to 200 and $y$ varying from 0 to 100.

13. Process of making a polysulfide polymer having $x$ repeating units

—SC$_2$H$_4$OCH$_2$OC$_2$H$_4$OC$_2$H$_4$OCH$_2$OC$_2$H$_4$S— and $y$ repeating units

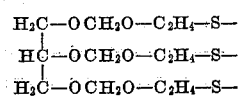

and hydroxy terminals, which comprises reacting dithio diethylene glycol $HOC_2H_4SSC_2H_4OH$, diethylene glycol, the dithio diethylene glycol being at least 50 percent by weight of the total glycol content, glycerine, formaldehyde, and BB' dichlor diethylene formal, the mol ratio of the total glycol content to formaldehyde being greater than 1 and not greater than 2, the proportion of glycerine to said dithio diethylene glycol being from 0.5 to 5.0 mol percent, and the mol ratio of said formal to said dithio diethylene glycol being $$\frac{1}{x+y+1}$$

where $x$ and $y$ are the desired number of said repeating units in the resulting polymer, and effecting the reaction by heating the reactants to a temperature of 80° to 140° C., $x$ varying from 2 to 200 and $y$ varying from 0 to 100.

No references cited.